June 20, 1967  H. R. BILLETER  3,326,335
DOUBLE ACTING SLACK ADJUSTER
Filed June 16, 1965  3 Sheets-Sheet 1
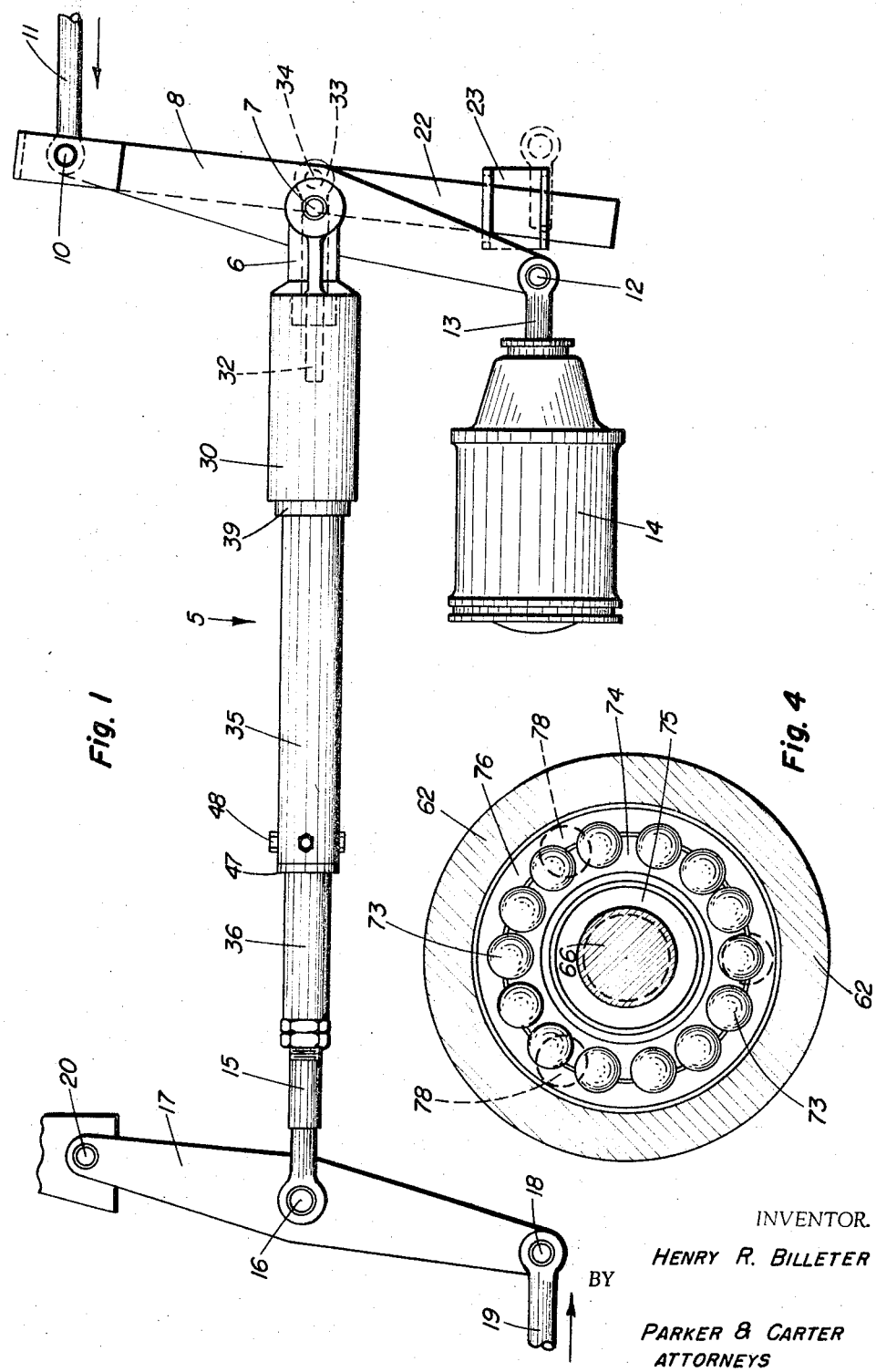
INVENTOR.
HENRY R. BILLETER
BY
PARKER & CARTER
ATTORNEYS

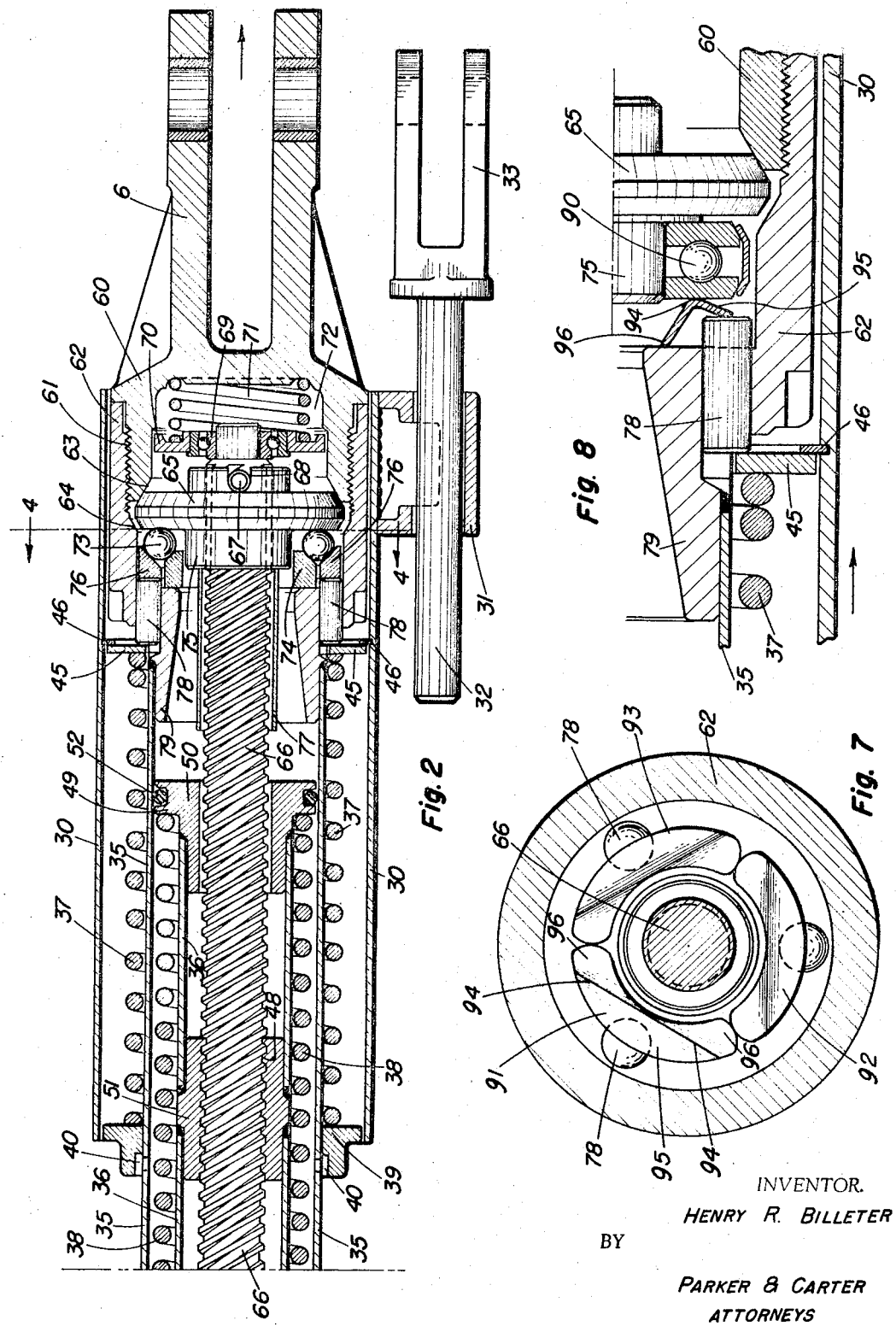

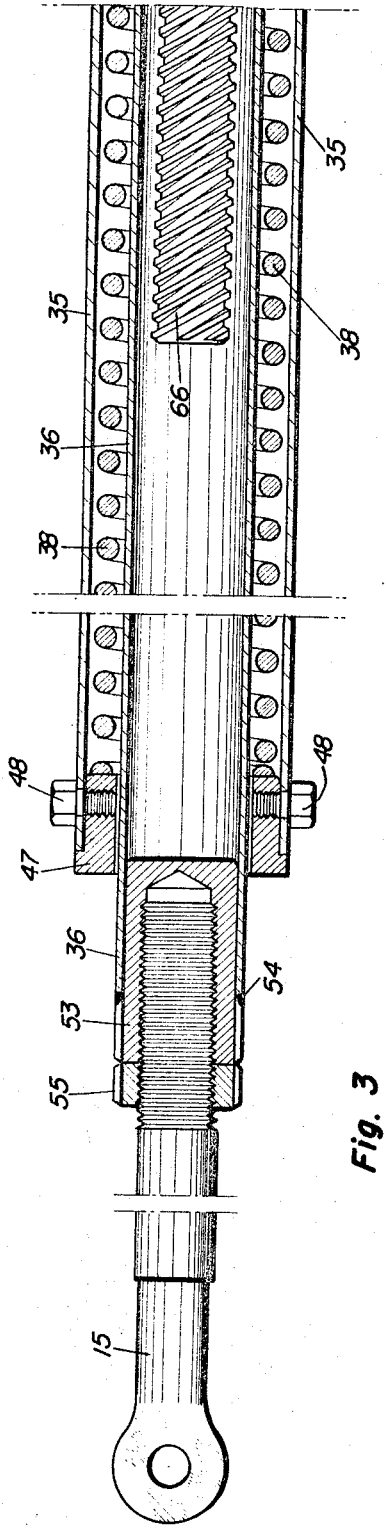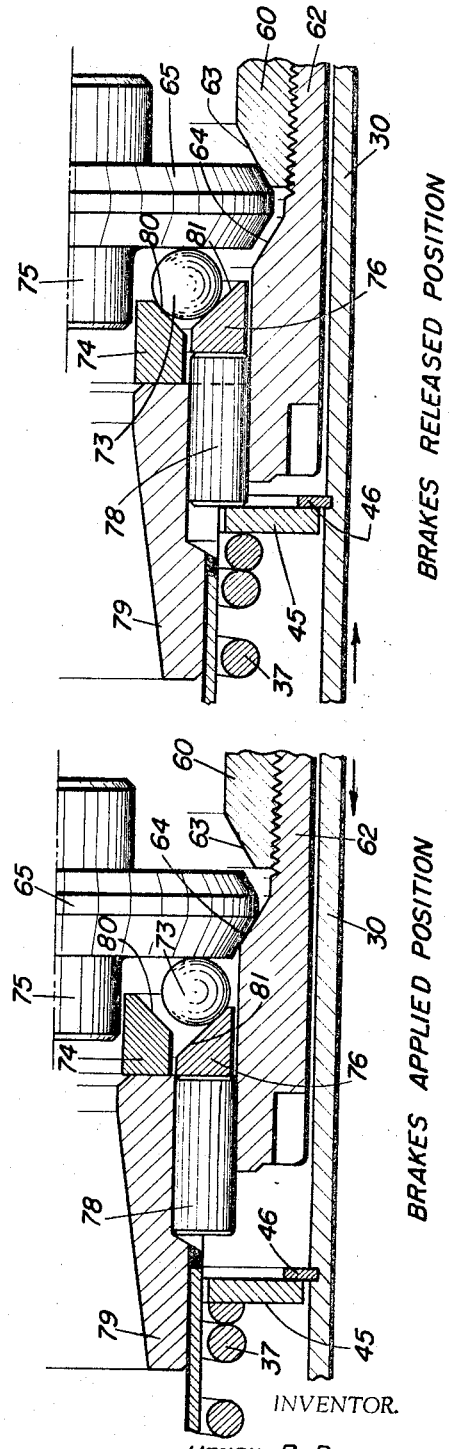

United States Patent Office 3,326,335
Patented June 20, 1967

3,326,335
DOUBLE ACTING SLACK ADJUSTER
Henry R. Billeter, Deerfield, Ill., assignor to Sloan Valve Company, Chicago, Ill., a corporation of Illinois
Filed June 16, 1965, Ser. No. 464,381
14 Claims. (Cl. 188—202)

ABSTRACT OF THE DISCLOSURE

This slack adjuster enables a slack take up to be made of at least 18 inches from the former 12 inches without increasing the overall length of the same. Separate ball races having inclined surfaces are adapted to press the ball bearings against the clutch, one ball race being controlled by the power spring and the other by the trigger spring, in an arrangement whereby the effective force of the trigger spring against the clutch, is doubled.

*Cross reference to related application*

This application is in the nature of an improvement on applicant's prior application Ser. No. 415,968, filed Dec. 4, 1964, for "Double Acting Slack Adjuster," by Henry R. Billeter.

This invention relates in general to slack adjusters for adjusting slack in the brake rigging of railway cars, and the principal object of the invention to provide a new and improved double acting slack adjuster for automatically taking up or letting out slack in order to maintain optimum brake shoe clearance.

One object is to provide an improved slack adjuster device which automatically maintains a predetermined brake cylinder push rod travel by compensating for wear of the brake shoes, brake rigging, the installation of new brake shoes, and other factors tending to effect braking efficiency.

Another object is to design a new and improved slack adjuster which is simpler and more compact in construction, light in weight, shorter in overall length, is dirt and dust proof, and because of the fewer parts and elements involved, is more reliable and positive in its operation, and is also immune from false adjustments under severe service conditions.

As is well known in the art the railroad companies have formulated regulations as specified under the A.A.R., which require that the power stroke of the brake cylinder push rod be within the dimensions of 7 and 9 inches. However brake cylinders are customarily proportioned and installed on a railway car to accommodate a push rod stroke up to 12 inches under certain extreme conditions that may be encountered. When new cars are placed in service and the brake rigging properly adjusted, and assuming that new brake shoes are also installed, the brake cylinder push rod should provide an optimum stroke of 8 inches.

Most slack adjusters at the present time, when installed in the brake rigging or linkage can initially provide for the proper 8 inch stroke of the push rod by an adjustment of up to about 12 inches. However railway cars are becoming increasingly longer with the resultant overall lengthening of the brake rigging and linkage, the use of thicker brake shoes, worn wheels and bearings, careless work, and other factors. The need is therefore for a slack adjuster which will provide a much greater range of adjustment, say up to 18 inches. The present slack adjusters cannot provide such greater adjustment without increasing the overall length of the same, and this is not practical because of space and weight limitations. To provide the increased range it would be necessary to greatly increase the length of the power spring and still resist false let out.

It is an object of the present invention therefore to design a new and improved automatic double acting slack adjuster which can provide for a greater overall range when installed in a railway car without an excessive increase in length or weight of the slack adjuster.

A further object is to design an improved slack adjuster in which the effective capacity to resist premature let out of the power spring is greatly augmented without increasing the length of the same and in which the possibility of false let out is prevented under all service conditions.

In accordance with the foregoing object the invention contemplates a means in the slack adjuster for augmenting the power of the power spring by the use of a novel combination of ball bearings and ball races arranged between a rotatable clutch and control spring means.

With the foregoing and other objects in view, the invention consists in the novel construction, combination, and arrangements of the parts and elements described and illustrated in the accompanying drawings, and pointed out in the appended claims.

Referring to the drawings;

FIGURE 1 is a plan view illustrating a typical brake linkage arrangement on a railroad car with the improved slack adjuster of the invention shown therein;

FIGURE 2 is a cross-sectional view of the right hand end portion of the slack adjuster mechanism;

FIGURE 3 is a cross-sectional view of the left hand end portion of the device;

FIGURE 4 is an enlarged section of the clutch bearing taken along the lines 4—4 of FIGURE 2;

FIGURE 5 is a cross-section of a portion of the device in one of its positions;

FIGURE 6 is a similar cross-section in another one of the positions of the device;

FIGURE 7 shows a modification of a portion of the device, while

FIGURE 8 is a detail of the modified form of the invention.

The improved double acting slack adjuster of the invention is adapted for installation in the brake linkage of a railway car in the usual position between the brake cylinder push rod and brake shoes, and commonly as a center rod connection in the brake rigging between the live lever and the dead lever, and when so installed will automatically take up excess slack as the brake shoes wear, and let out slack when new brake shoes are installed. Thereby a constant predetermined travel of the brake cylinder push rod is maintained within the limits prescribed by standard railroad practice regulations.

The slack adjuster comprises a single unitary structure 5 of cylindrical smooth shape and in which the operating elements are totally enclosed for dust-proof and weather protection. At the right-hand end of the device 5 a clevis 6 is pivotally connected by pivot pin 7 to the central portion of live lever 8. Referring to the position of the parts in FIGURE 1, the upper end of live lever 8 has a pivot pin 10 for connection with the linkage 11 of the brake rigging leading to the brake shoes (not shown). The bottom end of live lever 8 is pivoted by pin 12 to the end of push rod 13 of the brake cylinder 14, which has a movable piston therein responsive to the usual brake control of the railway car in a brake application, to actuate the push rod 13.

The left-hand end of the slack adjuster 5 has a pull rod portion 15 extending from it which is pivoted by pin 16 to the mid-point of dead lever 17. This lever in turn is pivoted at 18 on its lower end to the brake linkage 19 leading to the brake shoes. At its upper end, dead lever 17 is pivoted at 20 to a stationary part of the railway car frame. The live lever 8 further has an actuating lever 22 pivoted at its upper end as shown by pivot pin 10, while at the lower end it is loosely slidable in a bracket 23 supported on the railway car frame.

The general arrangement of the foregoing elements is such that outward projection of the push rod 13 by action of the brake cylinder 14 results in the movement of levers 8 and 17, together with the slack adjuster 5 so that braking pull is applied to the linkages 11 and 19 in the direction of the arrows as shown, to produce an application of the brakes. The angular distance between the actuating lever 22 and live lever 8 is proportional to the travel of the brake cylinder piston rod 13.

Referring now particularly to FIGURES 2 and 3, with FIGURE 3 arranged as the left hand portion of the device, the slack adjuster enclosing means comprises several telescoping housing tubes protecting the internal mechanism from dust and other debris as well as constituting operating elements in the device, thereby serving multiple purposes. The large outer trigger spring housing tube 30 is axially shiftable along the unit outside the assembly and at one end has a bracket 31 welded to it supporting a slidable shaft 32 of the trigger clevis 33. The trigger clevis 33 is attached by pivot pin 34 to the approximate mid-point of actuating lever 22, alongside and opposite the pivot pin 7 of the live lever 8, as seen in FIGURE 1. A second intermediate tube or main spring housing 35 is slidably located between trigger spring tube 30 and an inner third tube defined as the pull rod housing tube 36. The three tubes 30, 35, and 36 are axially slidable relative to one another and under certain operating conditions telescope within one another.

Arranged between tubes 30 and 35 there is a trigger spring 37 while between tubes 35 and 36 there is arranged a power or main spring 38. The left hand end of trigger spring 37 abuts a collar 39 surrounding tube 35, and is slidable within tube 30. The collar 39 is prevented from moving to the left by a number of studs 40 which lie in recesses formed in the inner diameter of collar 39 and are fitted in holes in the tube 35. The trigger spring 37 and power spring 38 normally hold the collar 39 against the studs 40 in the position shown. The main power spring 38 is compressed sufficiently to exert a minimum force of about 550 pounds, when in operation, while the trigger spring 37 will exert a force of about 150 pounds under compression.

At its right hand end trigger spring 37 abuts a washer 45 which in turn is pressed by the spring 37 against a snap ring 46 recessed and supported in a groove around the inner wall of trigger tube 30. Trigger spring 37 is thereby confined between collar 39 and washer 45 and is compressed whenever the trigger tube 30 is shifted or moved to the left. The washer 45 is also normally forced by spring 37 against the left hand ends of several clutch pins 78 to project them forward against a novel bearing arrangement, and this in turn against clutch 65, as will be pointed out hereinafter.

The main spring 38 is confined at one end by a collar 47 attached to the main spring tube 35 by bolts 48, with the collar 47 slidable axially with respect to tube 36. At the right hand end main spring 38 abuts a guiding sleeve 50, the shank portion of which fits into the inner diameter of pull rod tube 36 and is suitably welded thereto. The flange portion 49 of sleeve 50 is provided with an annular recess in which an O-ring 52 is mounted so the sleeve 50 is able to axially slide along the inner diameter of tube 35, with some slight friction produced by the O-ring 52. The O-ring 52 also serves to centralize the tubes 35 and 36 with respect to each other and prevent vibration and wear in the parts. Spaced from the guide sleeve 50 and welded to the inside of tube 36 is an adjusting nut 51 having an internal threaded axial bore 48 therein.

The left hand end of the slack adjuster, FIGURE 3, has a threaded pull rod 15 connected at one end with a clevis 6, attached to dead lever 17, by pin 16 and the other end threaded into a tail adapter 53 suitably welded as at 54 to the end of power tube 36. A lock nut 55 is provided on the threaded rod 15 to lock up the rod when the slack adjuster is initially installed in the brake rigging of a railway car.

At the opposite end of the slack adjuster, FIGURE 2, the clevis 6, attached to live lever 8, has a clutch housing 60 formed on it having threaded engagement at 61 with a second clutch housing 62. Both clutch housings 60 and 62 are freely slidable within the trigger tube 30. Oppositely disposed annular clutch surfaces 63 and 64 are formed in clutch housings 60 and 62 respectively, and between them a rotatable clutch member 65 is positioned and adapted to be rotated and shifted back and forth between the clutch surfaces 63 and 64 under control of various forces and stresses as will be pointed out. Rotatable clutch 65 is secured to one end of an elongated threaded adjusting rod 66 having threads throughout its length and which threads have a relatively high helix angle so as to be non-self locking. The clutch 65 is bored and tapped to receive the end of the adjusting rod 66 and is then securely locked onto the rod to prevent the clutch from rotating relative to the rod 66. The lock pin 67 accomplishes the purpose by passing through the rod and engaging oppositely disposed notches 68 formed in the hub portion of clutch 65. The clutch 65 can therefore be rotated along with the adjusting rod 66 as the rod is screwed back and forth through the adjusting nut 50.

At the right hand end of threaded rod 66 and around a reduced diameter of the rod, there is an antifriction bearing 69 held in place by a disc 70 against which a lock-up spring 71 presses. The other end of lock-up spring 71 engages the housing 60 and exerts a force of about 60 pounds against the bearing 69 and thereby against the end of threaded rod 66. The foregoing elements are all arranged within a recess formed in the clutch housing 60 in a manner so that lock-up spring 71 presses the bearing 69 up against the lock of threaded rod 66, tending to push the clutch member 65 away from clutch surface 63.

On the opposite side of clutch 65 there is a second bearing means comprising the novel combination of a series of bearing balls 73 held against the side of clutch 65 by a pair of special annular ball races, the inner one of said ball races 74 surrounding the hub 75 of the clutch 65, and the outer ball race 76 contacted by the ends of the pins 78. The clutch housing 62 is provided with a reduced shank portion 79 which is inserted into the end of tube 35 and welded to the tube end around the external diameter of the tube as shown. The threaded rod 66 extends axially through the shank 79 and has a short tube 77 around the rod 66 of a length extending from the clutch hub 75 to a point slightly beyond the end of the shank 79, for a purpose to be defined hereafter.

Between the clutch housing 62 and its shank portion 79 a series of equally spaced bores are drilled into which the clutch pins 78 are slidably supported. These clutch pins have one end in operative engagement with the outer ball race 76 and the other end contacted by the washer 45, so that in the "brake released" condition of the slack adjuster as shown in FIGURE 6 the trigger spring 37 presses against washer 45 and pushes pins 78 against the outer ball race 76 thereby forcing the clutch member 65 into engagement with clutch surface 63. The main power spring 38 pushing against sleeve 50 and thus in turn tube 36, adjusting nut 51, and rod 66, also forces the clutch against clutch surface 63. This combination of forces acting against clutch 65 to hold it against clutch surface 63 in the "brake released" position prevents accidental rotation and shifting of the clutch by shocks and vibrations, which may be experienced during service operation of the railway car.

The annular ball races 74 and 76 each have an inclined surface 80 and 81 respectively, which surfaces are adapted to come into contact and press against the bearing balls 73 at an angle of approximately 45 degrees as best seen in FIGURES 5 and 6. The outer ball race 76 is controlled by the action of the trigger spring 37 and trigger tube 30, while the inner ball race 74 abuts the shank 79 in the housing 62. The angle of the inclined surfaces 80 and 81 is such that the pressure on outer ball race 76 by the trigger spring 37 against the ball bearings 73 is augmented, the angle of contact being such that the effective force of the trigger spring 37 is doubled. For example, with the main spring 38 having a force of about 550 pounds and the trigger spring 37 about 150 pounds, the trigger spring force is doubled by the ball race arrangement to thereby provide a total effective force against the clutch of 850 pounds. This is reduced to 790 pounds when the force of the opposing lock-up spring 71 is deducted. The addition of the 150 pounds of force supplied by the ball race combination enables the length of the power spring 38 to be materially reduced, in fact by about 2½ feet without in any way decreasing the effective force of the spring. Thereby the slack adjuster is enabled to provide a wide variance in the linkage slack of the levers, up to at least 18 inches. To accommodate the greater adjustment if needed, the threaded rod 66 is lengthened within power tube 36, but without increasing the length of the tube 36 or the power spring 38. To prevent wobble and vibration of the longer rod 66 the guiding sleeve 50 is provided spaced between the adjusting nut 51 and the clutch 65.

For reasons well understood in the art, the maximum stroke of the brake cylinder push rod 13 in response to a braking operation, cannot exceed 12 inches, and an optimum range of 8 inches is selected for the slack adjuster to make its automatic adjustment for any abnormal slack which may be present in the brake linkage. The various parts of the brake linkage and slack adjuster are illustrated in the drawings, FIGURES 1 and 2, as they generally appear in the position in which the brakes are released and the railway car is in the running position.

When a brake application takes place the push rod 13 is forced outward by the air pressure in the brake cylinder 14, thereby operating live lever 8, and since the upper end of actuating lever 22 is also pivoted at 10 together with the live lever 8, and the lower end of actuating lever 22 is slidably restrained by bracket 23, the levers 8 and 22 will separate angularly from each other. The slack adjuster being pivoted to the center portion of live lever 8 by pivot 7, the angular movement of both levers 8 and 22 will cause the center pivot 34, of actuating lever 22 to push trigger clevis 33 and its shaft 32 inward after a certain amount of movement of lever 8. This movement is calculated so that the lower end of live lever 8 will be operated by the push rod 13 a distance of about 8 inches before inward movement of the trigger clevis 33 takes place.

In the normal running position of the railway car, the trigger spring 37 exerts a force upon washer 45 as pointed out, and this in turn upon the clutch pins 78, the ball race 76 and ball bearings 73, to firmly hold the clutch 65 against clutch surface 63. The power spring 38 is also effective to add to this force and hold the clutch in locked position through the medium of adjusting screw 66 and adjusting nut 51. The additional and augmented force supplied due to the particular arrangement of the ball races and ball bearings insures that false take-ups are prevented when the device is subjected to vibrations and shocks during service operations. Also under extreme conditions when slack up to 19 inches is encountered the combined force of the springs and bearing arrangement is sufficient to hold the clutch 65 locked in position without adding additional length to the main spring 38.

Assume now that there is an insufficient amount of slack in the brake rigging as would be the case when one or more new brake shoes have been installed. It is therefore necessary to introduce some measure of slack into the brake system for proper operation, as by increasing the overall length of the slack adjuster in order to have the proper piston travel. Under the foregoing condition of insufficient slack and upon a brake application, the brake cylinder push rod 13 advances to operate the levers 8 and 17 until a position is reached in which the brake shoes engage the car wheels. During this relatively short movement the slack adjuster acts as a solid link between the brake levers as shown in FIGURES 2 and 3, and because of the combined resistance of the trigger spring 37 and power spring 38 augmented by the additional force supplied by the bearing ball races 74 and 76, the clutch 65 is thereby locked up tightly against clutch surface 63. Because of the insufficient slack the brake shoes make contact with the car wheels before the push rod 13 has traveled the regulation 8 inches in its stroke.

As additional stresses are built up in the braking system with the brake shoes engaged, the trigger spring 37 and power spring 38 are further compressed. The additional stresses may also include other forms of resistance such as ice, snow, and debris collected on the brake shoes. The result is that the clutch 65 is finally freed from its engagement with clutch surface 63 and conditioned for rotation. The trigger spring 37 however continues to exert pressure upon the clutch 65 augmented by the amplified force in the ball races, and since the clutch 65 is now free of restraint, between clutch surfaces 62 and 63 the adjusting rod 66 is unscrewed from adjusting nut 51, as the clutch is rotated on bearings 73, and the slack is let out. This lengthening action of the slack adjuster continues until the regulation 8 inch travel of the push rod has taken place, whereupon the actuating lever 22 is effective through clevis 33 and rod 32 to shift the trigger tube 30 to the left to further compress the trigger spring 37 so that washer 45 relieves the pressure on clutch pins 78 and the ball races from the clutch 65. Lock-up spring 71 is thereby effective to exert its force upon the other side of clutch 65 to shift it immediately into engagement with left hand clutch surface 64, thereby halting the unscrewing action of rod 66 and locking up the slack adjuster as a solid link in the system with the brakes firmly applied.

The lack of sufficient slack has now been automatically compensated for and the correction has been made directly during the brake application. The adjusting nut 51 has been shifted to the left on rod 66 from its previous position and upon succeeding brake applications the push rod 13 will operate within the regulation 8 inch stroke. Responsive to brake release action the stresses and tension in the brake rigging are relieved and the brake shoes move away from the wheels. The power spring 38 is thereby effective due to its stored up energy, to restore the various parts of the slack adjuster back to their normal positions as shown. The trigger spring 37 also forces the pins 78 against ball race 76 and ball bearings 73 against clutch 65, to hold the clutch 65 tightly against clutch surface 63.

Assume now that due to wear of the brake shoes which takes place on each brake application and other wear points in the brake linkage, an excessive amount of slack has accumulated in the braking system, so that the travel of the piston in the brake cylinder 14 would be greater than the regulation amount. Under these conditions a brake application results in the usual advancement of the push rod 13 as before and operation of the live lever 8 and dead lever 17. At this time the slack adjuster also remains as a solid link due to the tension in springs 37 and 38 and the augmented force supplied by ball races 74 and 76 so that the clutch 65 is frictionally held from rotation or movement against clutch surface 63. However slightly before the push rod 13 has reached its optimum 8 inch stroke, the actuating lever 22 operates trigger bracket 31 and this in turn causes shifting of trigger tube 30 in a left hand direction. As a result trigger spring 37 is compressed to relieve the pressure on pins 78 and bearing races 74 and 76. Power spring 38 however is at this time still effective to hold the clutch 65 against clutch surface 63 through the medium of adjusting nut 51 and threaded rod 66.

When the brake shoes eventually engage the car wheels and tension in the brake linkage mounts, power spring 38 is compressed and overcome so that its pressure against the clutch is relieved. As a consequence lock-up spring 71 is now effective to force clutch 65 against the left clutch surface 64 and lock it up in that position. The slack adjuster is now conditioned as a solid link in the brake rigging and the brakes are firmly in contact with the car wheels, but no slack take up has taken place at this time. The foregoing action in effect only measures the amount of excess slack in this system.

Upon subsequent release of the brakes, air pressure is gradually reduced in the brake cylinder 14 until a point is reached at which the power spring 38 can expand and exert its stored up energy through adjusting nut 51 and rod 66 against clutch 65 to push the same away from clutch surface 64. Lock-up spring 71 at the same time tends to push against the opposite side of clutch 65 with the result that the clutch is free to rotate between the two clutch surfaces without restraint. This action permits power spring 38 to expand and force the rigid adjusting nut 51 to the right along the threaded rod 66 thereby screwing up and rotating the rod 66 along with the rotation of the clutch as the brake releasing action continues. The excess slack is accordingly taken up by the adjusting rod 66 during brake release. Subsequently when the position is reached where the actuating lever 22 releases its pressure upon bracket 31 and therefore the trigger tube 30, the trigger spring 37 is effective to release its stored up energy and forces clutch pins 78 against ball race 76 and bearings 73, and because of the sloping angular surfaces 80 and 81 does so with increased force against the clutch 65 to again overcome the tension of lock-up spring 71. This action shifts the clutch 65 to the right hand side into engagement with clutch surface 63 thereby locking up the slack adjuster to its proper length with the excess slack taken up. With the excess slack condition now corrected the next brake application will result in the power stroke of the push rod 14 being normal.

From the foregoing action it will be clear that when the slack is *let out* the clutch 65 is pushed by the *trigger* spring 37 to pull and unscrew the threaded rod 66 outward from the fixed adjusting nut 51, to lengthen the slack adjuster.

In the slack *take up* action the adjusting nut 51 is pushed by the power spring 38 along the adjusting rod 66 to cause the rod to be screwed into the nut and shorten up the length of the slack adjuster.

The spacer tube 77 around adjusting rod 66 serves as a stop to keep the guide sleeve 50 from moving too far to the right and engaging shank 79 to prevent lock-up or binding of the clutch against clutch surface 64.

Referring now to the modification, FIGURES 7 and 8 show another means for adding additional force to the power of the springs without increasing the length of the same. A conventional ball race and ball bearing 90 are provided around the hub 75 of clutch 65, and a series of three circular bowed segments 91, 92 and 93 are arranged against the bearing 90. Each segment is bowed outward at opposite ends from points 94 so the shorter side 95 is contacted by the pin 78 and the longer side 96 is in contact with the shank 79 of the housing 62. Since the point 94 is against bearing 90 and is rocked thereon, it will be obvious that any force applied by the push pins 78 against the segment ends 95 will be augmented by the increased leverage against the end 96 applied to the shank end 79 and against bearing 90.

While a preferred embodiment and modification of the invention has been illustrated and described herein, it is to be understood that changes and variations may be made by those skilled in the art without departing from the spirit and scope of the invention as specified in the appended claims.

What is claimed is:

1. In a double acting automatic slack adjuster for the brake linkage of a railway car, a housing including telescoping tubes each of which is connected to a different portion of said brake linkage, a threaded adjusting rod extending within said tubes, clutch means on said threaded rod, clutch surfaces on one of said tubes between which said clutch means is adapted to operate in response to abnormal slack conditions present in said brake linkage, power spring means between said tubes normally tending to hold said clutch means against one of said clutch surfaces, trigger spring means for biasing said clutch means toward a clutch surface, and means between said clutch means and said trigger spring means for increasing the effective power of said trigger spring means upon said clutch means.

2. In a double acting automatic slack adjuster for the brake linkage of a railway car in which the amount of excess slack that can be taken up is increased from at least 12 inches to at least 18 inches without increasing the overall length of the slack adjuster, a housing including a pair of telescoping tubes each connected to a different portion of said brake linkage, a threaded adjusting rod extending within said tubes, clutch means on said threaded rod, clutch surfaces on one of said tubes between which said clutch means is adapted to be rotated in response to abnormal slack conditions in said brake rigging and in which said clutch means is adapted to be stopped when in contact with one of said clutch surfaces, whereby slack is either let out or taken up, power spring means in said tubes for moving said clutch means into one of its positions with said clutch surfaces, trigger spring means in said tubes for moving said clutch means into another of its positions with said clutch surfaces, and means arranged between said power and trigger spring means engaging said clutch means for augmenting the action of said power and trigger spring means upon said clutch means, said augmenting means at least doubling the effective force of said trigger spring means against said clutch whereby the length of said power spring means will be the same as the length of the power spring means of a slack adjuster with a 12-inch take-up, and whereby the length of said threaded rod is made at least 6 inches longer to adjust for up to 18 inches take-up.

3. In a double acting automatic slack adjuster for the brake linkage of a railway car in which the amount of excess slack that can be taken up is increased from at least 12 inches to at least 18 inches without increasing the overall length of the slack adjuster, a housing tube connected to one portion of said linkage, a threaded rod connected to another portion of said linkage, a clutch on said threaded rod, clutch surfaces on said housing between which said clutch is adapted to operate, a trigger spring for controlling the operation of said clutch in response to one condition of slack in said linkage, a power spring for controlling the operation of said clutch in another condition of slack in said linkage, and means for increasing the power of said trigger spring to thereby reduce the overall length of said power spring, said means effective to at least double the force of said trigger spring against said clutch whereby the length of said power spring remains the same as the power spring of a slack adjuster with a 12 inch take up, and whereby the length of said threaded rod is increased to at least 6 inches to adjust for up to 18 inches of slack take-up.

4. In a double acting automatic slack adjuster for the brake linkage of a railway car in which the amount of excess slack that can be taken up is increased from at least 12 inches to at least 18 inches without increasing the overall length of the slack adjuster, a housing tube connected to one portion of said linkage and having opposed clutch surfaces formed therein, a threaded rod connected to another portion of said linkage and having a clutch supported thereon, said clutch adapted to operate between said clutch surfaces in response to various conditions of slack in said rigging and to correct the same, and to be stopped when in contact with either of said clutch surfaces, a power spring for controlling the operation of said clutch under one condition of slack, a trigger spring for controlling said clutch under another condition of slack, bearing means engaging said clutch in one of its positions, and means incorporated in said bearing means for increasing the effective power of said trigger spring without increasing the length of said power spring, said bearing means effective to at least double the force of said trigger spring against said clutch whereby the length of said power spring is the same as the power spring of a 12-inch take-up slack adjuster, and whereby the length of said threaded rod is increased to at least 6 inches to adjust for slack take-up of at least 18 inches.

5. In a double acting automatic slack adjusted for the brake linkage of a railway car, a housing tube connected to one portion of said linkage and having opposed clutch surfaces therein, a threaded rod connected to another portion of said linkage and having a clutch carried therein, said clutch adapted to be moved between said clutch surfaces under different conditions of slack in said linkage to correct the same, said clutch being stopped from operating when in engagement with either of said clutch surfaces, a power spring for controlling the operation of said clutch in response to one condition of slack, a trigger spring for controlling said clutch under another condition of slack, bearing means in engagement with said clutch, said bearing means including ball bearings, and two ball races arranged against one side of said ball bearings tending to push said ball bearings into engagement with said clutch, one of said ball races contacting one portion of said ball bearings and controlled by said power spring, and the other of said ball races contacting another portion of said ball bearings and controlled by said trigger spring, said ball races being arranged so as to provide a multiplication of power to said power spring without increasing the effective length of said power spring.

6. In an automatic double acting slack adjuster of the type described including a clutch operated responsive to variable conditions of slack in the brake rigging, and a power spring and a trigger spring for controlling the action of said clutch, bearing means for said clutch including ball bearings and an inner and outer ball race arranged on one side of said ball bearings, each ball race having an inclined surface on one side in engagement with a portion of each ball bearing, each of said ball races being in engagement on its other side with one of said springs, and cooperative means between said ball races and said ball bearings effective to increase the power of one of said springs.

7. In an automatic double acting slack adjuster of the type described including a clutch operated responsive to variable conditions of slack in the brake rigging together with a power spring and a trigger spring controlling the action of said clutch, bearing means for said clutch between said clutch and said springs, said bearing means including an inner ball race and an outer ball race on the side of said ball bearings opposite said clutch, each ball race having an inclined surface in engagement with a different portion of each of said ball bearings on one side and in operative engagement with one of said springs on the other side thereof whereby said bearing means is adapted to be forced against said clutch by the tension of said springs, and cooperative means between said ball races and said ball bearings for increasing the force of said springs against said clutch.

8. In an automatic double acting slack adjuster of the class described including a clutch and bearing means acting upon said clutch, said bearing means including ball bearings and an inner ball race and an outer ball race, each ball race having an inclined surface adapted to contact a portion of each of said ball bearings, the angle of said inclined surfaces being such that the movement of either ball race against said ball bearings produces an amplification of power against said clutch, and a power spring exerting its force against said bearing means.

9. In an automatic double acting slack adjuster of the type as described including a clutch and spring means for controlling the action of said clutch, bearing means arranged between said clutch and said spring means, said bearing means including a series of ball bearings in engagement with said clutch, and a pair of ball races on the other side of said ball bearings, said ball races including a separate inner ball race having an inclined surface contacting one portion of said ball bearings, and an outer ball race having an opposing inclined surface contacting another portion of said ball bearings, said inclined surfaces being constituted and arranged to augment the force of said spring means upon said ball bearings, whereby the force of said spring means is increased without requiring additional length in said spring means.

10. In a double acting automatic slack adjuster of the type described including a clutch and spring means for controlling the action of said clutch, power augmenting means arranged between said clutch and said spring means whereby the effective force of said spring means is increased without increasing the length of said spring means, said power augmenting means including a series of curved and center bowed segments, each segment having one side portion bent up longer than the other, each side portion being in operative engagement with said spring means and the center bowed portion in operative engagement with said clutch means, whereby the bowed portions of said segments are rocked against said clutch means by application of power to said segment side portions by said spring means.

11. A double acting slack adjuster as claimed in claim 10 in which the bowed segments each comprise a curved portion having a straight portion extending lengthwise across the segment from which straight portion the segment is bent and extends outward to provide a relatively long section engaged by said spring means and a relatively short section engaged by said spring means, the straight portion of said segments being rocked against said clutch means by application of power from said spring means to said segment sections.

12. In an automatic double acting slack adjuster of the class described including a clutch and bearing means acting upon said clutch, said bearing means including bearing balls opposed to said clutch and an inner ball race and an outer ball race, each ball race having an inclined surface adapted to contact a different portion of each of said bearing balls, and a power spring exerting its force against said bearing means.

13. The structure of claim 12 characterized by and including a trigger spring operatively cooperating with one of said ball races, the power spring operatively cooperating with the other.

14. In an automatic double acting slack adjuster of the type described including a clutch operated responsive to variable conditions of slack in the brake rigging together with a power spring and a trigger spring controlling the action of said clutch, bearing means for said clutch between said clutch and said springs, said bearing means including bearing balls opposed to said clutch, an inner ball race and an outer ball race on the side of said bearing balls opposite said clutch, each ball race having an inclined surface in engagement with a different portion of each of said bearing balls on one side and in operative relation with one of said springs on the other side thereof whereby said bearing means is adapted to be forced against said clutch by the force of said springs.

References Cited
UNITED STATES PATENTS 3,177,985  4/1965  Rauglas _____ 188—196 X DUANE A. REGER, *Primary Examiner.*